US012637155B2

(12) United States Patent
Algüera et al.

(10) Patent No.: US 12,637,155 B2
(45) Date of Patent: May 26, 2026

(54) FIFTH WHEEL COUPLING SYSTEM, TRACTOR VEHICLE, AND TRACTOR-SEMITRAILER COMBINATION

(71) Applicant: JOST-WERKE DEUTSCHLAND GMBH, Neu-Isenburg (DE)

(72) Inventors: José Manuel Algüera, Aschaffenburg (DE); Swen Saupe, Mainz (DE); Khairo Bobaki, Frankfurt (DE)

(73) Assignee: JOST-WERKE DEUTSCHLAND GMBH, Neu-Isenburg (DE)

( * ) Notice: Subject to any disclaimer, the term of this patent is extended or adjusted under 35 U.S.C. 154(b) by 479 days.

(21) Appl. No.: 18/310,599

(22) Filed: May 2, 2023

(65) Prior Publication Data

US 2023/0356552 A1 Nov. 9, 2023

(30) Foreign Application Priority Data

May 6, 2022 (DE) .......................... 102022111393.0

(51) Int. Cl.
*B62D 53/08* (2006.01)
*B60D 1/58* (2006.01)
*B62D 15/02* (2006.01)

(52) U.S. Cl.
CPC ................ *B62D 53/08* (2013.01); *B60D 1/58* (2013.01); *B60Y 2200/148* (2013.01); *B62D 15/023* (2013.01)

(58) Field of Classification Search
CPC . B60D 1/015; B60D 1/62; B60D 1/58; B62D 53/08; B62D 15/023; B62D 53/0871; B60Y 2200/148
See application file for complete search history.

(56) References Cited

U.S. PATENT DOCUMENTS

| | | | |
|---|---|---|---|
| 5,152,544 A | 10/1992 | Dierker, Jr. et al. | |
| 11,512,979 B2 * | 11/2022 | Sielhorst | ................ G01D 5/145 |
| 11,794,705 B2 * | 10/2023 | Sielhorst | ................. B60D 1/62 |
| 12,371,100 B2 * | 7/2025 | Batista | ................. B62D 15/023 |
| 2021/0206217 A1 * | 7/2021 | Angermann | ........... B62D 53/08 |
| 2021/0347420 A1 * | 11/2021 | Peitz | ...................... B60D 1/015 |
| 2021/0379941 A1 * | 12/2021 | Peitz | ........................ G01D 5/16 |
| 2021/0394570 A1 | 12/2021 | Wahba et al. | |

FOREIGN PATENT DOCUMENTS

| | | |
|---|---|---|
| CN | 113815642 A | 12/2021 |
| DE | 19964045 A1 | 7/2001 |
| DE | 102018116192 A1 | 1/2020 |
| DE | 102018123644 A1 | 3/2020 |

(Continued)

OTHER PUBLICATIONS

European Office Action for family member application No. EP23171012.0 dated Sep. 15, 2023.

(Continued)

*Primary Examiner* — Valentin Neacsu

*Assistant Examiner* — Marlon A Arce

(74) *Attorney, Agent, or Firm* — Hudak, Shunk & Farine Co. LPA

(57) ABSTRACT

A fifth wheel coupling system including a fifth wheel coupling and an angle measuring device, wherein the angle measuring device features at least one degree of freedom relative to the fifth wheel connection.

19 Claims, 6 Drawing Sheets

(56) References Cited

FOREIGN PATENT DOCUMENTS

| | | | |
|---|---|---|---|
| DE | 102020121315 | A1 | 2/2022 |
| EP | 2899101 | A1 | 7/2015 |
| EP | 3925865 | A1 | 12/2021 |
| GB | 2470610 | A | 12/2010 |
| GB | 2486474 | A | 6/2012 |
| WO | 2009000765 | A2 | 12/2008 |
| WO | 2010019027 | A1 | 2/2010 |
| WO | 2013180562 | A1 | 12/2013 |
| WO | 2020248035 | A1 | 12/2020 |

OTHER PUBLICATIONS

European Office Action for family member application No. EP23171012.0 dated Oct. 7, 2025.
First Office Action dated Feb. 2, 2026 for corresponding Chinese Application 202310496168.5 with English translation.

* cited by examiner

FIFTH WHEEL COUPLING SYSTEM, TRACTOR VEHICLE, AND TRACTOR-SEMITRAILER COMBINATION

FIELD OF THE INVENTION

The present invention relates to a fifth wheel coupling system, a tractor vehicle, and a tractor-semitrailer combination.

BACKGROUND OF THE INVENTION

A tractor-semitrailer combination generally consists of a tractor vehicle having a fifth wheel coupling and a semitrailer having a king pin. The semitrailer is attached to and pulled by the tractor vehicle by way of the fifth wheel coupling. Power is transmitted between the tractor vehicle and the semitrailer via the king pin. The king pin is thus a central element in the connection between a semitrailer and a tractor vehicle.

In the case of straight-line travel of the tractor-semitrailer combination, three driving conditions can occur with regard to the forces acting on the king pins: pulling mode, pushing mode, and a neutral travel mode. In pulling mode, the tractor vehicle pulls via the king pin on the semitrailer. This is reversed during pushing mode, when the semitrailer pushes the tractor vehicle. For example, the pushing mode starts during active braking by the tractor vehicle. In the neutral driving state, no forces occur in the direction of travel between the tractor vehicle and the semitrailer. In practice, the neutral driving state occurs rarely and generally only in transition.

The manufacturers of semitrailers, tractor vehicles, and tractor-semitrailer combinations have a fundamental interest in gaining knowledge of the driving state present at any specific time. In particular, there is an interest in continuous detection and, if necessary, control of the driving state. Several systems have therefore become known from the state of the art that attempt to make this possible.

For this purpose, GB2486474A discloses a king pin in which piezo elements are integrated into the pin body. Piezo elements change their electrical conductivity when a mechanical load is applied to them. The king pin comprises two piezo elements in the edge region. One piezo element is arranged in front in the travel direction, and one piezo element is arranged in the rear in the travel direction. In this way, the piezo element arranged in front can detect the pushing mode, and the piezo element arranged in the rear can detect the pulling mode.

Known from EP 2 899 101 A1 is a king pin which is attached to a semitrailer by means of a support plate. The king pin and the support plate comprise a common vertical bore that runs centrally within the king pin. Arranged in the bore is a lever, via which forces during the pushing and pulling modes are transferred by means of two spring elements, thereby pivoting the lever. The pivoting movement of the lever is detected by sensing elements, thereby determining the state of the vehicle. The spring elements are arranged in radial bores which communicate with the vertical bore. The radial bores highly weaken the king pin in this device, so there is a risk of breaking the king pin.

In the case of cornering of the tractor-semitrailer combination, the king pin is the pivotal point between the tractor vehicle and the semitrailer. There is an interest in capturing the angle between the tractor vehicle and the semitrailer (articulation angle) as accurately as possible. The target parameter is a precision of less than 1° of deviation. Given this information, steerable axes of the semitrailer can, e.g., be controlled in order to assist in turning. Various systems are known in the prior art for detecting the angle between the tractor vehicle and the semitrailer.

WO 2010/019027 A1 discloses a system for detecting the relative position of the tractor vehicle and semitrailer, in which the fifth wheel coupling of the tractor vehicle has a pin and the king pin has a complementary recess. However, this system is intended solely for the coupling operation and is therefore not suitable for determining the angle between the tractor vehicle and semitrailer while cornering.

In a system described in WO 2013/180562 A1, the king pin comprises either a magnet or a coil. The fifth wheel coupling is respectively provided with the other element. Using this system, it should be possible to detect a relative rotation of the king pin relative to the fifth wheel coupling.

Another system, by means of which the relative rotation between the tractor vehicle and the semitrailer is determined, is disclosed in WO 2009/000765 A2. Provided therein is a rotary sensor, which comprises a sensor disc, which is part of the semitrailer and arranged around the king pin. The rotary sensor is connected to the fifth wheel coupling of the tractor vehicle when the semitrailer is coupled to the tractor vehicle and is then able to rotate relative to the king pin. By means of a sensor unit, the relative rotation between the sensor disc and the king pin is then detected, whereby the relative rotation between the tractor vehicle and the semitrailer can also be determined.

In another EP 2 899 101 A1 embodiment, the king pin comprises a gear that engages a gear of the fifth wheel coupling when the tractor vehicle and semitrailer are coupled. Rotation of the gear of the fifth wheel coupling is detected, thereby determining a relative rotation between the tractor vehicle and the semitrailer.

What the solutions in the prior art have in common is the necessity of a king pin having a special design adapted to the respective solution. However, it would be desirable if the articulation angle could also be determined in semitrailers with standardised king pins.

Further systems used for detecting the articulation angle are known from U.S. Pat. No. 5,152,544, DE 199 64 045 A1, and WO 2020/248035 A1. However, these systems are complex and do not result in precise measurements of the articulation angle.

DE 10 2018 123 644 A1 relates to a sensor device having a swivel bearing arrangement.

DE 10 2018 116 192 A1 relates to a tractor vehicle connection sensor device with a friction lock driver.

SUMMARY OF THE INVENTION

Therefore, the object of the invention is to provide a system, by means of which the articulation angle between the tractor vehicle and the semitrailer can be precisely determined.

This object is achieved by means of the fifth wheel coupling system according to the invention.

The fifth wheel coupling system comprises a lower structure, a fifth wheel coupling plate, and an angle measuring device. The lower structure and the fifth wheel coupling plate together form a fifth wheel coupling. The fifth wheel coupling plate comprises an insertion opening for a king pin of a semitrailer accessible in the direction of travel F, and a bay for the king pin connecting to the insertion opening in the direction of travel F. The angle measuring device comprises a rotor and a sensor, wherein the rotor is supported so as to be rotatable relative to the sensor about a rotation axis D, and the sensor being configured to sense a rotation of the rotor about the rotation axis D relative to the sensor. The rotor or the sensor comprises a magnetic coupling, by means of which the rotor or the sensor is releasably (i.e., temporarily) connectable to the king pin. The angle measuring device features at least one degree of freedom with respect to the lower structure and/or the fifth wheel coupling plate.

The invention is based on the knowledge that the lack of accuracy in previous systems results from, among other things, relative movements and rotations between components of the angle measuring device. In the case of U.S. Pat. No. 5,152,544, for example, the sensor is attached to the chassis of the tractor vehicle, whereas the rotor is provided in the form of a magnet on the king pin. It has become known that the movements of the semitrailer during travel in previous systems lead to the magnet and sensor not only rotating about the axis of rotation D relative to each other, but also moving, e.g., laterally relative to each other. Such movements result in sensor measurement errors, thereby rendering the measurement results of the articulation angle inaccurate or wholly false.

The solution according to the invention provides that the angle measuring device features at least one degree of freedom with respect to the lower structure and/or the fifth wheel coupling plate, i.e., with respect to the fifth wheel coupling. Movements and rotations of the semitrailer relative to the tractor vehicle result in elastic deformations of the fifth wheel coupling wheel plate and/or the lower structure, as well as movements and rotations of the king pin within the bay of the fifth wheel coupling plate. Any degree of freedom results in elastic deformation or movement and rotation along the degree of freedom then having no influence on the relative position and orientation of the sensor and the rotor. The sensor and the rotor together follow the movement of the king pin within the respective degree of freedom. As a result, measurement errors are prevented, and a more precise measurement of the articulation takes place.

The degrees of freedom in particular include movement along a transverse axis Q, and/or movement along a longitudinal axis L, and/or movement along a vertical axis H, and/or rotation about the transverse axis Q (tilting), and/or rotation about the longitudinal axis L (swaying). The longitudinal axis L extends along the direction of travel F of the tractor-semitrailer combination when traveling in a straight line. The vertical axis H extends along the direction of gravity. The transverse axis Q extends perpendicular to the longitudinal axis L and to the vertical axis H. The degrees of freedom along the transverse axis Q and the longitudinal axis L compensate in particular for movements of the king pin due to tolerances and wear phenomena. The degrees of freedom along the vertical axis H and about the rotation axis Q, as well as about the rotation axis L, compensate in particular for movements of the king pin on uneven surfaces (poorly maintained roads) and vibrations or deformations of the semitrailer plate.

The angle measuring device can be attached to the lower structure and/or the fifth wheel coupling plate. An arrangement is preferably provided on the lower structure because the lower structure performs fewer movements relative to the chassis of the tractor vehicle.

Advantageously, the lower structure comprises at least two bearing blocks. In particular, the lower structure comprises two bearing blocks and a crossbeam connecting the bearing blocks along the transverse axis Q. The angle measuring device can be arranged on the bearing blocks and/or on the crossbeam. Arrangement on the crossbeam enables a central arrangement of the angle measuring device, thus reducing construction effort.

Preferably, the fifth wheel coupling plate is connected to the lower structure, in particular to the bearing blocks, such that it can perform a tilting movement about the longitudinal axis L and/or about the transverse axis Q relative to the lower structure or the bearing blocks. These tilting movements are particularly advantageous on poorly maintained surfaces. According to the invention, the associated movements of the king pin are compensated for by the angle measuring device having a degree of freedom opposite the lower structure and/or the fifth wheel coupling plate, which enables rotation about the transverse axis Q and/or rotation about the longitudinal axis L.

In advantageous further developments, in order to provide the entire angle measuring device the desired degrees of freedom, the angle measuring device comprises a bracket, on which the sensor is fixedly arranged and within which the rotor is rotatably mounted, wherein the bracket is slidably and/or rotatably connected to the lower structure and/or the fifth wheel coupling plate.

The sensor is preferably a magnetic angle sensor. The rotor can be entirely comprised of the magnetic coupling rotatably supported in the bracket. The sensor can be configured to directly detect a rotation of the magnetic coupling. Alternatively, the sensor can comprise a sensor magnet, which is coupled to the magnetic coupling of the rotor and which also rotates upon rotation of the magnetic coupling. The sensor is then configured to detect a rotation of the magnetic coupling by detecting the rotation of the sensor magnet.

Alternatively, the rotor can comprise a shaft, to which the magnetic coupling is attached. The shaft is rotatably supported in the bracket and extends as far as the sensor. In this embodiment, the sensor is configured to detect rotation of the shaft. For this purpose, a sensor magnet can be arranged on the shaft, the rotation of which is detected by the sensor. However, the rotation of the shaft can also be detected by the sensor in other ways, e.g. by optical means, in particular by means of markings arranged on the shaft.

Providing degrees of freedom in one respect means a more complex structure for each additional degree of freedom. In another respect, any degree of freedom enables the removal of a source of interference when measuring the articulation angle. Therefore, it is advantageous to achieve a compromise when providing degrees of freedom. The same applies to the corresponding dimensions. In principle, an unlimited degree of freedom can be provided, e.g., by means of a ball bearing. However, the more extensively the degree of freedom is provided, the more complicated the structural implementation is. It has become known that the relative movements between the semitrailer and the tractor vehicle during travel are not very large, although they are sufficient to lead to the aforementioned measurement errors. Preferably, the degree of freedom along the transverse axis Q enables movement by a length from >0 mm to 30 mm, in particular between 10 and 30 mm. The degree of freedom along the longitudinal axis L preferably enables movement by a length from >0 mm to 40 mm, in particular between 10 and 40 mm. The degree of freedom along the vertical axis H preferably enables movement by a length from >0 mm to 50 mm, in particular between 10 and 50 mm. The degree of freedom about the transverse axis Q preferably enables rotation by an angle from >0° to 30°, in particular between 10° and 25°. The degree of freedom about the longitudinal axis L preferably enables rotation about the longitudinal axis L by an angle from >0° to 15°. This means that the measuring means in one exemplary embodiment is able to move on the transverse axis Q by a total travel distance of 20 mm, on the longitudinal axis L by a total travel distance of 30 mm, and on the vertical axis H by a travel distance of 10 mm relative to the fifth wheel coupling plate.

The degrees of freedom along the transverse axis Q, the vertical axis H, and the longitudinal axis L can each be effected by, e.g., a linear guide having stops, e.g., by means an oblong hole. The degree of freedom about the transverse axis Q and the degree of freedom about the longitudinal axis L can be effected by, e.g., a hinge having stops.

As previously described, relative movements between the sensor and the rotor can result in measurement errors. In advantageous further developments, it is therefore provided that the rotor and the sensor are connected to one another such that a translational relative movement between the rotor and the sensor along the rotation axis D is prevented. The rotor and the sensor are thus arranged at a defined, unchangeable distance from each other. In particularly advantageous further developments, the rotor and the sensor only feature one degree of freedom with respect to one another, i.e., rotation about the rotation axis D.

The king pin enters an insertion space during the connection operation, but not always at the same height. Lateral deviations are also possible due to wear and tolerances. There is a risk of damage to the rotor or sensor. Alternatively, it can therefore be provided that a translational relative movement between the rotor and the sensor along the axis of rotation D is enabled to a defined distance. The rotor or the sensor can then be located outside the insertion space, e.g., if no king pin is located in the insertion space. As a result, the rotor or sensor is protected from damage when king pin is being inserted. In this case, the rotor and sensor can, e.g., be directly connected to one another in an initial state. After the king pin has been inserted into the entry space of the fifth wheel coupling, the rotor or the sensor is attracted in the direction of the king pin by means of the magnetic coupling, but only as far as the defined distance. Such a distance can be achieved, e.g., by a linear guide having a stop. Since the distance is defined by the design, it always adjusts when used as intended and can accordingly be considered when evaluating the sensor signal. The fixed distance can prevent the magnetic coupling from coming into contact with the king pin. As a result, the king pin can later be extracted from the fifth wheel coupling without damaging the angle measuring device.

If a translational relative movement between the rotor and sensor is provided along the rotation axis D, a retaining spring is advantageously provided, which counteracts an increasing spacing (dissolved movement) of the rotor and the sensor.

In such embodiments, the rotor and sensor are at a predefined distance from each other in an initial state and can move apart from the spring force of the retaining spring when the king pin is retracted due to the magnetic attraction between the magnetic couplings and the king pin. If the king pin is removed from the fifth wheel coupling, the retaining spring pulls the rotor or sensor back into the initial state.

The bracket can be connected to the lower structure and/or the fifth wheel coupling plate either directly or via further components, in particular an arm. If the bracket is directly connected to the lower structure and/or the fifth wheel coupling plate, the at least one degree of freedom is preferably achieved by a corresponding support for the bracket on the lower structure and/or on the fifth wheel connection plate. If an arm is provided, a degree of freedom can be used either between the bracket and the arm, or between the arm and the lower structure or the fifth wheel coupling plate. Particularly preferably, at least one degree of freedom between the bracket and the arm is achieved, and at least one other degree of freedom is achieved between the arm and the lower structure or the fifth wheel coupling plate.

Any degree of freedom is preferably achieved by means of a corresponding bearing. The two components, in particular the bracket, the arm, the fifth wheel coupling plate and/or the lower structure, which effect the degree of freedom, are preferably arranged in a slidable and/or rotatable manner relative to one another. Preferably, the components are further biased by means of spring force contrary to their slidability and/or rotatability. The components are in this way moved into an initial position or initial orientation. The angle measuring device can thus, among other things, be prevented from colliding with and being damaged by the king pin during the connection process. The components can also be moved by means of multiple springs into an initial position or an initial orientation, wherein any movement or rotation from the initial position or initial orientation in two directions against a spring force is then possible. When a king pin is inserted into the fifth wheel coupling, the angle measuring device or the respective part is moved from the initial position along the degree of freedom, but preferably not over the entire length or rotation of the degree of freedom, rather only into an operating position. If the tractor vehicle and semitrailer are coupled, then the angle measuring device is accordingly located in the operating position. If movements of the king pin along the respective degree of freedom then occur during travel, the angle measuring device or the respective part is moved further along the degree of freedom, i.e., against the spring preload, or in the opposite direction. If the semitrailer is uncoupled, i.e., the king pin is extracted from the fifth wheel coupling, the angle measuring device or the respective part is again moved or rotated into the initial position.

The bracket can also be integral and comprise multiple sections that are interconnected, movable, and/or rotatable relative to one another via at least one flexible region. In this embodiment, the bracket is preferably directly connected to the lower structure and/or the fifth wheel coupling plate, wherein the sensor is fixedly arranged on the bracket, and the rotor is rotatably supported within the bracket. The degrees of freedom can be achieved by means of the integral design without additionally providing undesired degrees of freedom, e.g., via a tolerance-related clearance.

Preferably, the bracket and/or the arm are at least partially, in particular entirely, made of a non-magnetisable material, in particular aluminium, magnesium, brass, (fibre) composite, and/or a polymer. As a result, the bracket and/or the arm are prevented from disturbing the sensor system, i.e., affecting the measurement result of the sensor. In addition, with regard to the structural design of the bracket and the arm, it need not be ensured that the components interfere as little as possible with the sensor system because they do not readily lead to any material-related impairment.

It turns out that an arrangement of the rotor that is as central as possible on the king pin is advantageous with regard to detecting the articulation angle. In advantageous further developments, the angle measuring device therefore comprises a centring aid, by means of which the angle measuring device, and/or the rotor, and/or the magnetic coupling are positioned when the king pin is being inserted. Accordingly, the centring aid can perform a driver function. The king pin comes into contact with the centring aid during the connection operation and brings the angle measuring device along during the connection process. The position of the angle measuring device, and/or the rotor, and/or magnetic coupling relative to the king pin is simultaneously correctly adjusted. The arrangement of the rotor on the king pin is thereby reproducible, which makes the measurement results more precise. The centring aid preferably comprises at least one centring pin, in particular two centring pins, and/or a centring contour, e.g. an angled section. The centring contour provides the greatest possible adjustment relative to the king pin, thereby enabling a very precise measurement.

As previously mentioned, it has proven advantageous for the magnetic coupling not to come into direct contact with the king pin. Given direct contact, the holding force between the magnetic coupling and the king pin is very strong, which is why it is difficult to extract the king pin from the fifth wheel coupling. This can cause damage to the system. In advantageous further developments, it is therefore provided that the angle measuring device comprise at least one spacer, in particular a protrusion projecting from the bracket along the vertical axis H beyond the magnetic coupling and preventing the magnetic coupling from coming into direct contact with the king pin and/or causing the magnetic coupling to remain at a predefined distance from the king pin. The spacer is further used as protection for the magnetic coupling when the king pin is being inserted into and extracted from the fifth wheel coupling.

As previously mentioned, it is advantageous to protect the rotor and the sensor from damage when a king pin is being inserted. In advantageous further developments, the angle measuring device comprises at least one protective protrusion for protecting the angle measuring device or a part thereof against mechanical damage when a king pin is being inserted. The protective protrusion can in particular be designed as a ramp. When the king pin strikes the ramp, it pushes the angle measuring device out of the way without damaging it. It is particularly advantageous if the protective protrusion is designed as a ramp, i.e. as a double ramp, both in the insertion direction and contrary to the insertion direction of the king pin. As a result, the angle measuring device is pushed out of the way during both insertion and extraction. The protective protrusion and the spacer can be formed by a single component.

Said object is also achieved by means of a tractor vehicle according to the invention for a semitrailer. The tractor vehicle comprises a chassis, an undercarriage, and a fifth wheel coupling system as described hereinabove. Optionally, the tractor vehicle comprises a mounting plate arranged on the chassis. The mounting plate is used for mounting various assemblies, in particular the fifth wheel coupling.

In the tractor vehicle according to the invention, the angle measuring device can comprise a bracket, on which the sensor is arranged and within which the rotor is rotatably mounted, wherein the bracket is slidably and/or rotatably connected to the chassis and/or the mounting plate. In this embodiment, the bracket is thus attached to the chassis or the mounting plate and is thereby indirectly also connected to the fifth wheel coupling. By means of the slidable and/or rotatable arrangement, the angle measuring device in these embodiments also features at least one degree of freedom relative to the lower structure and/or the fifth wheel coupling plate. In these embodiments, the angle measuring device as a whole is also coupled to the king pin and can thereby follow movements and/or rotations of the king pin such that there are in particular no lateral displacements between the rotor and the sensor. The measurement of the articulation angle becomes more precise as a result.

The sensor is advantageously connected to a control unit of the tractor vehicle. The sensor can in this way transmit the measurement signal directly to the control unit. The articulation angles can, e.g., then be displayed to the driver. Particularly advantageous is the use of the system according to the present invention in autonomously driving semitrailers. The control unit can in this context take into account the sensor measurement signal when actuating the drive of the tractor vehicle and/or semitrailer.

The object of the invention is also achieved by means of a tractor-semitrailer combination comprising a tractor vehicle according to the above description, wherein the rotor or the sensor in particular is releasably connected to the king pin by means of the magnetic coupling.

BRIEF DESCRIPTION OF THE DRAWINGS

The invention is illustratively described and explained hereinafter with reference to the drawings. Shown are.

DETAILED DESCRIPTION OF THE INVENTION

Figure 1:
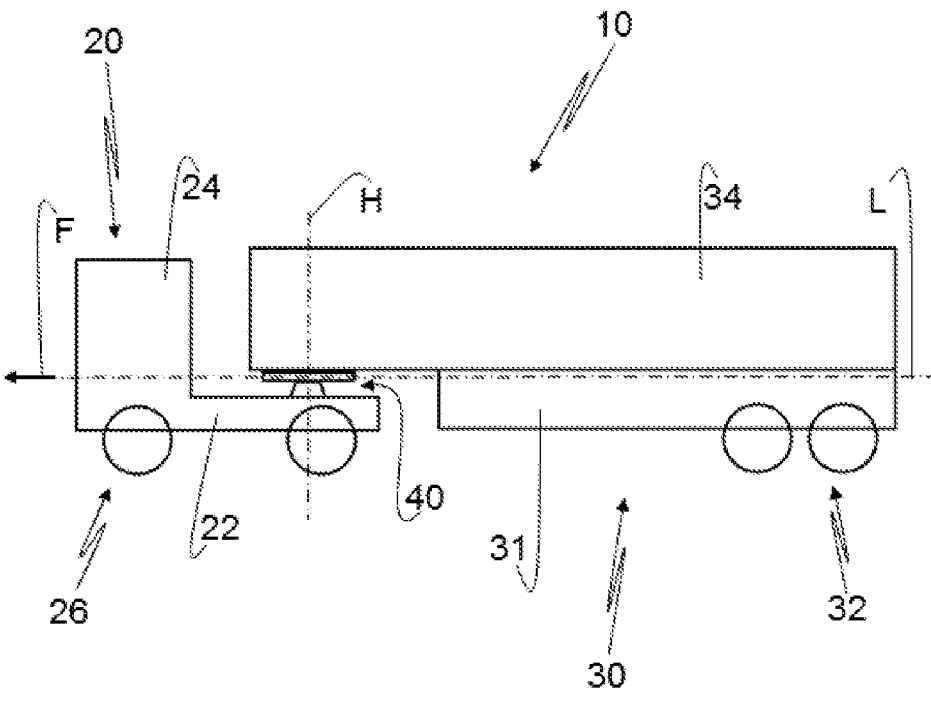
FIG. 1 a tractor-semitrailer combination in a side view.

FIG. 1 shows a tractor-semitrailer combination 10 comprising a tractor vehicle 20 and a semitrailer 30. The tractor vehicle comprises a chassis 22, a driver cab 24, and an undercarriage 26. A fifth wheel coupling 40 is arranged on the chassis 22. The semitrailer 30 comprises a chassis 31, an undercarriage 32, and an upper structure 34. Also shown are a vertical axis which extends in the direction of gravity, and a longitudinal axis L which extends in the direction of travel F.

Figure 2A:
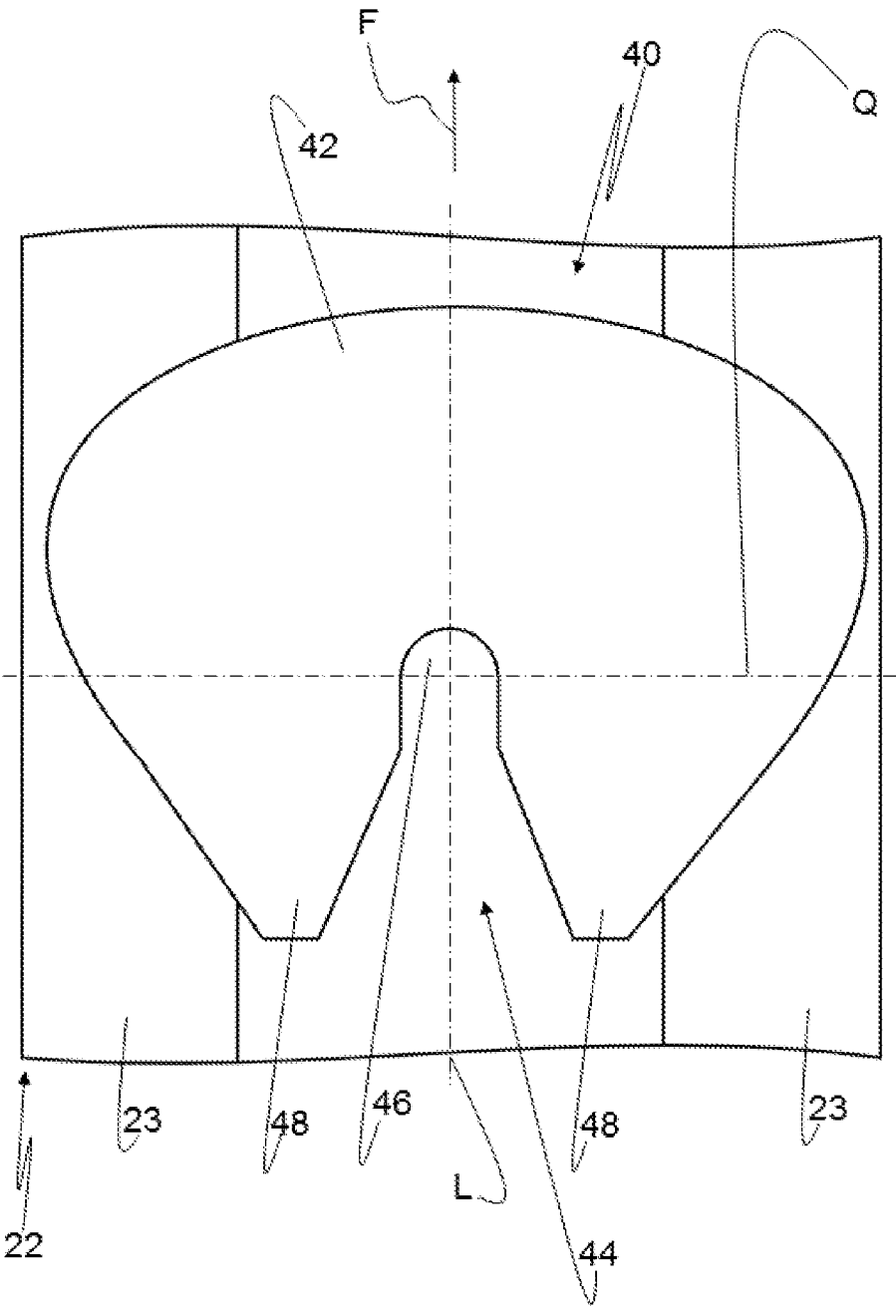
FIG. 2a a fifth wheel coupling in a top plan view.
Figure 2B:
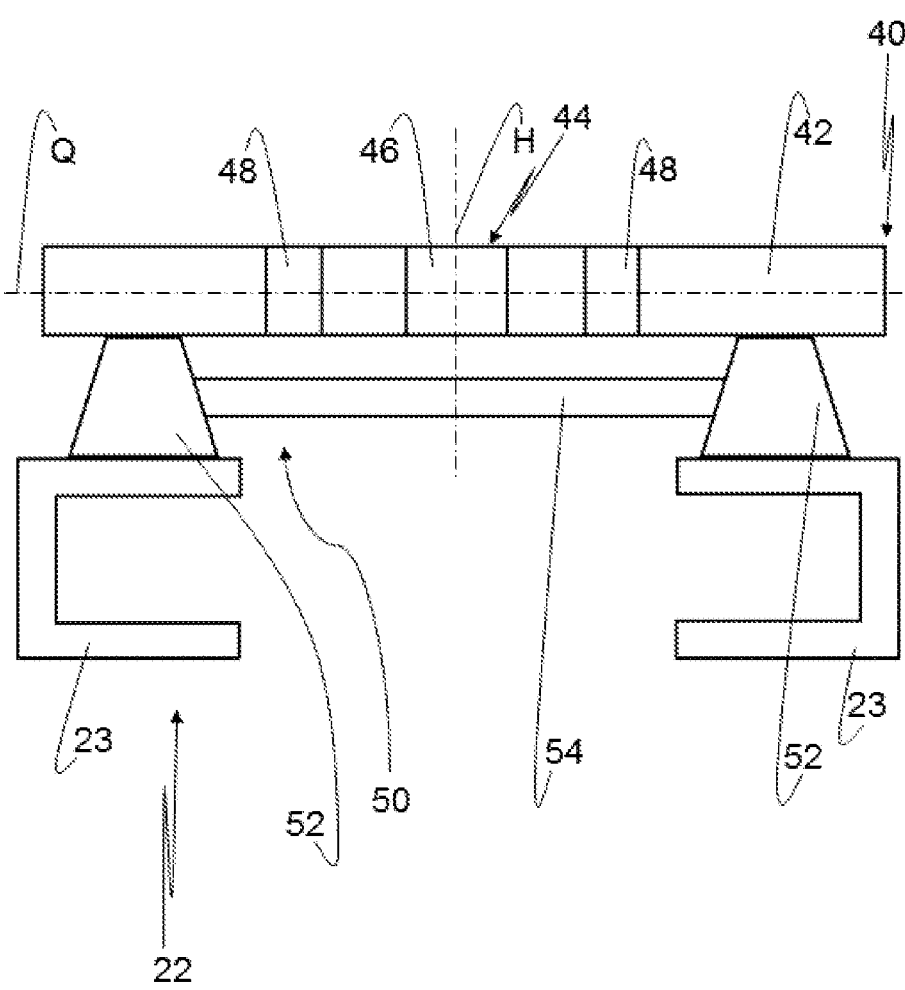
FIG. 2b a fifth wheel coupling in a rear view.

In FIGS. 2a and 2b, the fifth wheel coupling 40 of FIG. 1 is shown in more detail. The fifth wheel coupling 40 comprises a fifth wheel coupling plate 42. The fifth wheel coupling plate 42 comprises an insertion opening 44 accessible in the direction of travel F and a bay 46 connecting to the insertion opening. The insertion opening 44 is defined by two horns 48. To couple the tractor vehicle 20 and the semitrailer 30, a king pin (not shown in this case) enters the insertion opening 44 along the longitudinal axis L and continues into the bay 46. The king pin is locked in that location.

As can be seen from FIG. 2b, the fifth wheel coupling 40 comprises a lower structure 50 consisting of two bearing blocks 52 and a crossbeam 54 connecting the bearing blocks 52 along the transverse axis Q. The bearing blocks 52 are each arranged on a longitudinal beam 23 of the chassis 22. The fifth wheel coupling plate 42 is mounted on the bearing blocks 52.

Figure 3:
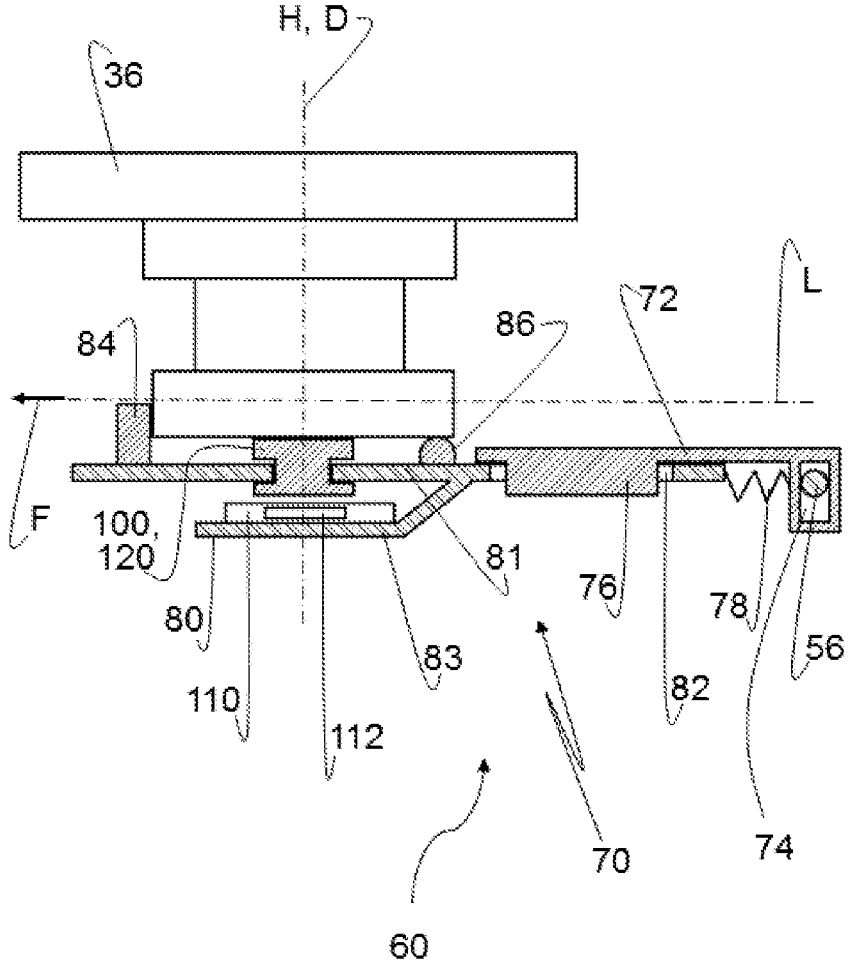
FIG. 3 a first embodiment of a fifth wheel coupling system according to the present invention in a partially schematic side view.
Figure 4:
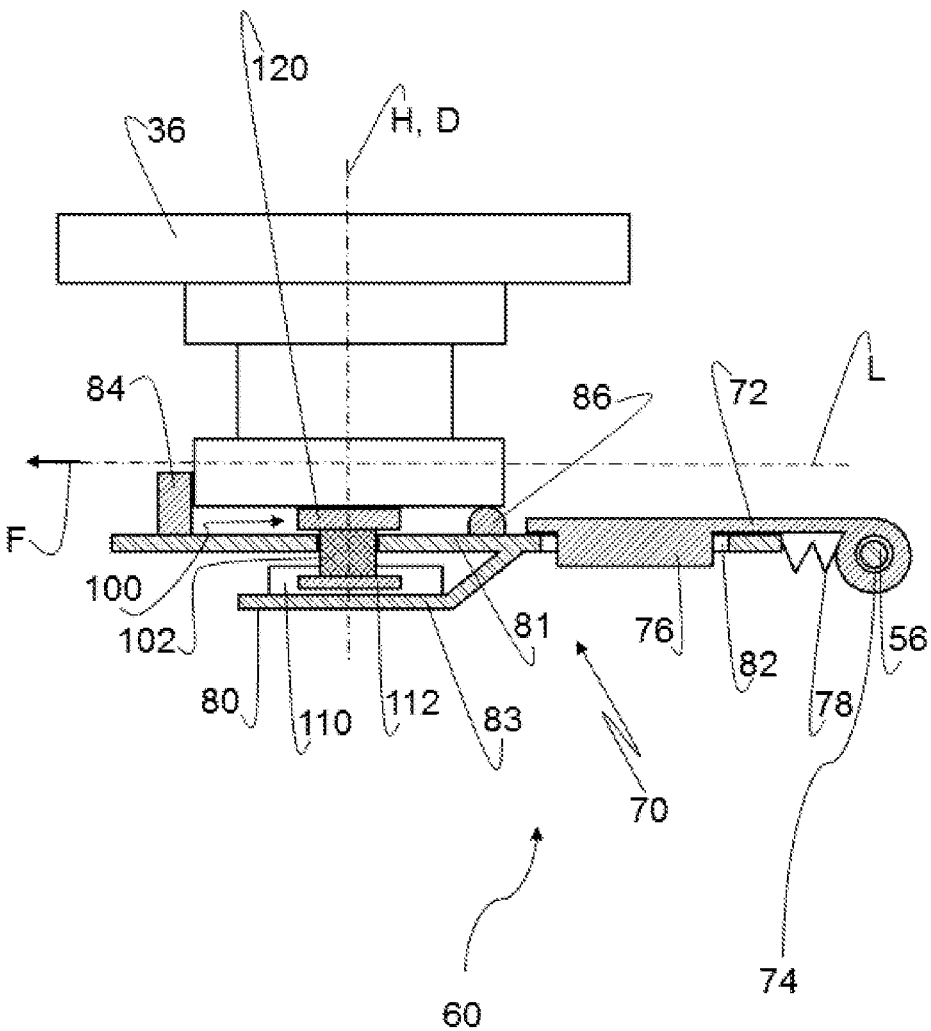
FIG. 4 a second embodiment of a fifth wheel coupling system according to the present invention in a partially schematic side view.
Figure 5:
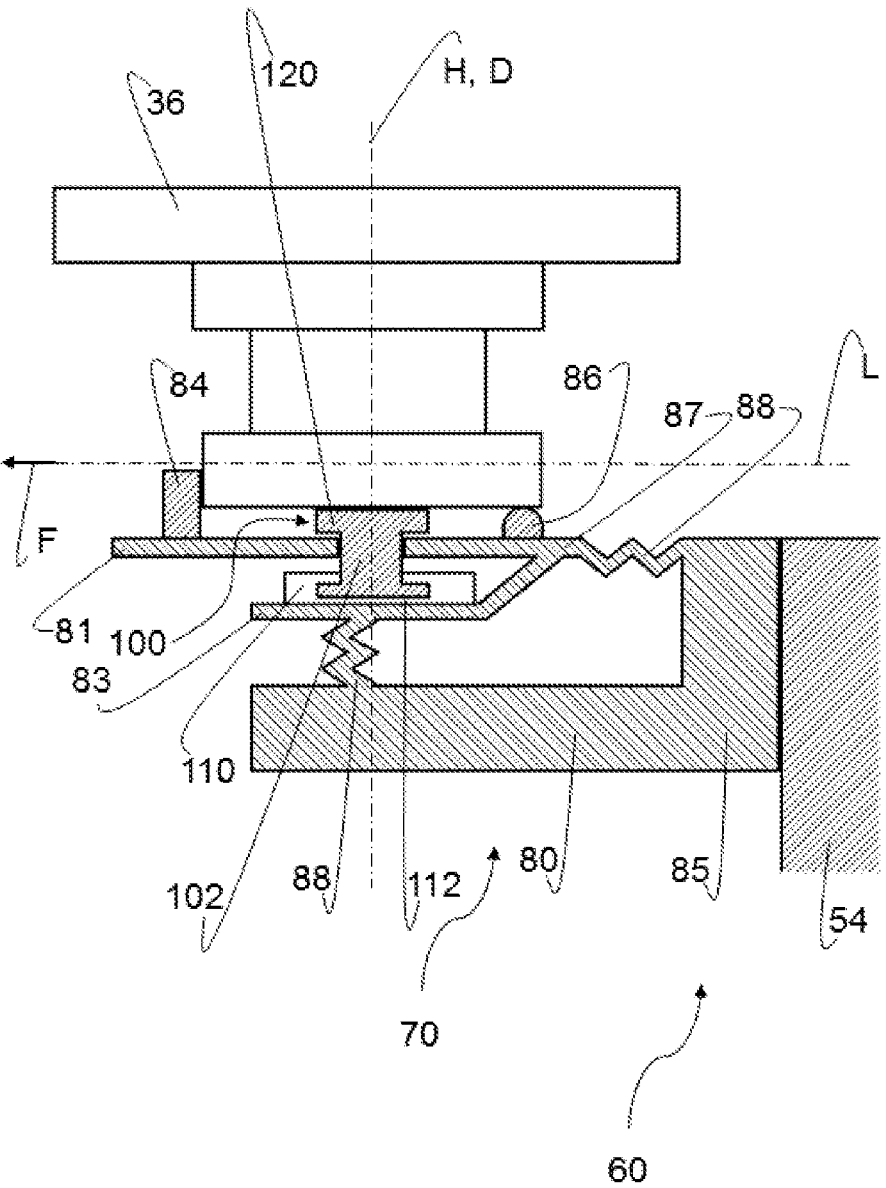
FIG. 5 a third embodiment of a fifth wheel coupling system according to the present invention in a partially schematic side view.

FIGS. 3, 4, and 5 show various embodiments of fifth wheel coupling systems 60, which can respectively be designed based on the fifth wheel coupling 40 in FIGS. 2a, 2b.

The fifth wheel coupling system 60 in FIG. 3 comprises an angle measuring device 70. The angle measuring device 70 comprises an arm 72 guided on a guide rod 56 and a bracket 80. The guide rod 56 is attached to the crossbeam 54 of the lower structure 50 of the fifth wheel coupling 40 (not shown in FIG. 3). The arm 72 can be moved in a translational manner along the transverse axis Q (i.e., perpendicular to the drawing plane) relative to the guide rod 56.

The guide rod 56 is circular in cross section. The arm 72 comprises a guide passage 74, which is rectangular in cross section, runs along the transverse axis Q, and receives the guide rod 56. The arm 72 is as a result rotatable about the transverse axis Q relative to the guide rod 56. At the same time, the arm 72 can by virtue of the geometry of the guide passage 74 be moved relative to the guide rod 56 along the vertical axis H, which extends in the direction of gravity.

The arm 72 and the guide rod 56 thus feature three degrees of freedom relative to each other: movement along the transverse axis Q, rotation about the transverse axis Q, and movement along the vertical axis H. All three degrees of freedom are limited, wherein the limitation of rotation about transverse axis Q is achieved by a stop (not shown in this case). Since the guide rod 56 is fixedly connected to the crossbeam 54, the angle measuring device 70 features the same three degrees of freedom overall relative to the lower structure 50 of the fifth wheel coupling 40.

The arm 72 further comprises a guide block 76 that is guided in a longitudinal guide 82 of the bracket 80 along the longitudinal axis L. The bracket 80 and the arm 72 are not movable relative to each other along the major axis H. The bracket 80 thus features a single degree of freedom relative to the arm 72, i.e., the movement in the longitudinal direction L. As a result, the angle measuring device 70 features the same degree of freedom relative to the lower structure 50 of the fifth wheel coupling 40.

Arranged between the arm 72 and the bracket 80 is a spring 78, which biases the arm 72 and the bracket 80 contrary to their displaceability. If no king pin 36 is arranged in the bay 46, the bracket 80 is pulled to the right by the spring 78 to an initial position.

The bracket 80 is forked in the front region and comprises a top retaining part 81 and a bottom retaining part 83. The retaining parts 81, 83 are not movable or rotatable relative to one another.

The angle measuring device 70 further comprises a rotor 100 and a sensor 110. The sensor 110 is fixedly arranged on the lower retaining part 83, and the rotor 100 is rotatably supported in the upper retaining part 81 about a rotation axis D. The rotor 100 and the sensor 110 are arranged such that the sensor 110 can detect rotation of the rotor 100 about the rotation axis D. In the embodiment shown, the sensor 110 is arranged vertically below the rotor 100.

The rotor 100 comprises a magnetic coupling 120, by means of which the rotor 100 is releasably connectable to a king pin 36 of the semitrailer 30. If a king pin 36 is located in the bay 46 of the fifth coupling 40, as shown in this case, the rotor 100 is fixed to the king pin by means of the magnetic coupling 120 and also performs all movements of the king pin 36 within the bay 46.

In the embodiment shown in FIG. 3, the rotor 100 consists entirely of the magnetic coupling 120. The sensor 110 further comprises a sensor magnet 112, which is rotated as the magnetic coupling 120 rotates.

The rotor 100 has clearance in the vertical direction, but its movement is limited. When a king pin 36 is located in the bay 46, the rotor is pulled as far as the stop by the attractive force between the magnetic coupling 120 and the king pin 36. The magnetic coupling 120 is thereby in a predefined position relative to the sensor 110.

When the king pin 36 rotates about the vertical axis H, the rotor 100 also rotates and the sensor magnet 112 rotates along with it, which can be detected by the sensor 110 as a articulation angle and transmitted to, e.g., a control unit of the tractor vehicle 20. Movements of the king pin 36 along the longitudinal axis L, the transverse axis Q, and the vertical axis H, as well as a tilting of the king pin 36 about the transverse axis Q, are compensated for by the aforementioned degrees of freedom because no corresponding relative movement or rotation takes place between the rotor 100 and the sensor 110. As a result, there are fewer deviations when measuring rotation about the axis of rotation D, thus resulting in a more precise measurement of the articulation angle.

The angle measuring device 70 further comprises a centring aid in the form of multiple centring pins 84, by means of which the angle measuring device 70 is positioned when the king pin is inserted. Only one of the centring pins 84 is visible. The centring pins 84 are arranged on and are projecting upward from a section of the bracket 80 that extends in the travel direction from the rotor 100.

The angle measuring device 70 further comprises a protective protrusion 86 for protecting the angle measuring device 70 against mechanical damage when a king pin 36 is being inserted. The protective protrusion 86 is arranged on a section of the bracket 80 opposite the direction of travel from the rotor 100 and projects upwardly away from bracket 80.

In an initial state, no king pin 36 is located within the fifth wheel coupling 40. The bracket 80 is pulled to the right by the spring 78, i.e., opposite the direction of travel F and located adjacent the front end of the guide block 76. The rotor 100 rests on the bracket 80, so the rotor is in its lower extreme position.

When a king pin 36 then enters the insertion opening 44 in the direction of travel F described hereinabove and further into the bay 46, the king pin initially comes into contact with the protective protrusion 86 if, due to tolerances, the bracket 80 is tilted slightly upwards or the king pin 36 projects further downwards than is shown in FIG. 3. The king pin 36 then pushes the bracket 80 out of the way by means of the protective protrusion 86 and continues to travel until it contacts the centring pins 84. The bracket 80 is aligned in that location relative to the king pin 36 by means of the centring pins. As a result, the rotor 100 is precisely and centrally located under the king pin 36. The rotor 100 is moved upward to its upper extreme position due to the presence of the king pin 36. The bracket 80, the rotor 100, and the protective protrusion 86 are designed such that the rotor 100 does not contact the king pin 36, but has a distance from the king pin 36 in its upper extreme position. The protective protrusion 86 acts as a spacer, which facilitates the subsequent extraction of the king pin 36 from the fifth wheel coupling 40 because the rotor 100 does not then need to detach from the king pin 36.

The king pin 36 continues to move in the direction of travel F when being inserted into the fifth wheel coupling 40 until reaching the edge of the bay 46, which occurs at different times due to tolerances. The king pin 36 brings the bracket 80 along to the bay, thereby tensioning the spring 78. The centring pins 84 act as drivers. The bracket 80 is then located in the operational position shown.

The angle measuring device 70 is immediately ready for use and detects any rotation of the king pin 36 about the axis of rotation D by means of the rotor 100 and the sensor 110. Movements of the king pin 36 along the longitudinal axis L, the vertical axis H, or the transverse axis Q are compensated for by the angle measuring device 70, as is rotation of the king pin 36 about the transverse axis Q. Starting from the operating position, the bracket 80 can, e.g., be moved along the longitudinal axis L in both one direction and the opposite direction in order to compensate for corresponding movements of the king pin 36. These movements and the rotation do not thereby adversely affect the detection of the articulation angle.

The embodiments of the fifth wheel coupling system 60 according to the invention shown in FIGS. 4 and 5 are partially identical to the embodiment shown in FIG. 3. The following primarily focuses on the key differences.

The fifth wheel coupling system 60 shown in FIG. 4 also comprises an angle measuring device 70 having an arm 72, wherein the arm 72 is guided on a guide rod 56. The guide rod 56 is again attached to a crossbeam 54 of the lower structure 50 of the fifth wheel coupling 40 (not shown in this case). The arm 72 can be moved along the transverse axis Q (i.e., perpendicular to the plane of drawing) in a translational manner relative to the guide rod 56.

The guide rod 56 is in this case also round in cross section. In the embodiment shown in FIG. 4, the arm 72 comprises a guide passage 74 which is circular in cross-section, runs along the transverse axis Q, and receives the guide rod 56. As a result, the arm 72 is rotatable about the transverse axis Q relative to the guide rod 56, but relative movement along the vertical axis H is not possible.

The arm 72 and the guide rod 56 thus feature two degrees of freedom relative to each other: movement along the transverse axis Q and rotation about the transverse axis Q. Both degrees of freedom are also limited in this case, wherein the limitation of rotation about the transverse axis Q is achieved by a stop (not shown here). Given that the guide rod 56 is fixedly connected to the crossbeam 54, the angle measuring device 70 features the same two degrees of freedom overall relative to the lower structure 50 of the fifth wheel coupling 40.

The guide between the bracket 80 and the arm 72 is identical to that in FIG. 3. The same applies to the spring 78, the protective protrusion 86, and the centring pins 84. The bracket 80 is also fork-shaped and comprises an upper retaining part 81 and a lower retaining part 83.

The rotor 100 here comprises three parts and a shaft 102, to which the magnetic coupling 120 is attached. The shaft 102 is supported in the upper retaining part 81 and extends as far as the sensor 110. The sensor magnet 112 is also arranged on and rotates along with the shaft 102. The sensor 110 is configured to detect rotation of the sensor magnet 112 and thus rotation of the shaft 102, the magnetic coupling 120, and the king pin 36. The shaft 102 is fixed in a vertical direction, so it cannot move relative to the sensor 110 along the vertical axis H.

In the embodiment shown in FIG. 5, the bracket 80 is directly connected to the crossbeam 54. The bracket 80 comprises an L-shaped base 85, which can be fixedly mounted to the crossbeam 54, e.g., by means of screws.

The bracket 80 further comprises a fork-shaped section 87 comprising the upper retaining part 81 and the lower retaining part 83. The fork-shaped section 87 is connected to the base 85 via flexible regions 88. Given the structural design of the flexible regions 88, the fork-shaped section 87 and the base 85 are movable and rotatable relative to each other. As a result, the forked section 87 and the base 85 feature multiple degrees of freedom with respect to each other, which can be different depending on the design of the flexible regions 88. In the embodiment illustrated, the fork-shaped section 87 and the base 85 are movable relative to one another along the vertical axis H and along the longitudinal axis L. In addition, the fork-shaped section 87 and the base 85 can be rotated and tilted about the transverse axis Q towards each other.

A protective projection 86 and centring pins 84 are again arranged on the upper retaining part 81.

The rotor 100 is in one piece and forms the magnetic coupling 120, the shaft 102, and the sensor magnet 112. The sensor 110 is configured to detect rotation of the rotor 100 about the axis of rotation D. As a result, the articulation angle can, e.g., be determined in the control unit of the tractor vehicle 20. Movements along the vertical axis H and along the longitudinal axis L, as well as rotation about the transverse axis Q of the king pin 36, are compensated for by the angle measuring device 70 and do not interfere with measurement by the sensor 110. The articulation angle can thereby be precisely determined.

LIST OF REFERENCE NUMBERS

10 Tractor-semitrailer combination
20 Tractor vehicle
22 Chassis
23 Longitudinal support
24 Driver cab
26 Undercarriage
30 Semitrailer
31 Chassis
32 Undercarriage
34 Upper structure
36 King pin
40 Fifth wheel coupling
42 Fifth wheel coupling plate
44 Insertion opening
46 Bay
48 Horn
50 Lower structure
52 Bearing block
54 Crossbeam
56 Guide rod
60 Fifth wheel coupling system
70 Angle measuring device
72 Arm
74 Guide passage
76 Guide block
78 Spring
80 Bracket
81 Upper retaining part
82 Longitudinal guide
83 Lower retaining part
84 Centring pin
85 Base
86 Protective protrusion
87 Fork-shaped section
88 Flexible region
100 Rotor
102 Shaft
110 Sensor
112 Sensor magnet
120 Magnetic coupling
D Axis of rotation
F Direction of travel
H Vertical axis
L Longitudinal axis
Q Transverse axis

The invention claimed is:

1. A fifth wheel coupling system, comprising:

a lower structure, a fifth wheel coupling plate, which has an insertion opening accessible in the direction of travel F for a king pin of a semitrailer, and a bay for the king pin connecting to the insertion opening in the direction of travel F, and an angle measuring device, which has a rotor and a sensor, wherein the rotor is supported such that it is rotatable relative to the sensor about a rotation axis D, and wherein the sensor is configured to detect a rotation of the rotor about the axis of rotation D relative to the sensor, wherein the rotor or the sensor comprises a magnetic coupling, by which the rotor or the sensor is releasably connectable to the king pin, wherein the angle measuring device features at least one degree of freedom relative to the lower structure and/or the fifth wheel coupling plate, wherein the angle measuring device comprises a bracket, on which the sensor is fixedly arranged and within which the rotor is rotatably mounted, wherein the bracket is slidably and/or rotatably connected to the lower structure, and wherein the bracket is connected to the lower structure either directly or via further components, except for the fifth wheel coupling plate.

2. The fifth wheel coupling system according to claim 1, wherein the degree of freedom is a movement along a transverse axis Q, and/or a movement along a longitudinal axis L, and/or a movement along a vertical axis H, and/or a rotation about the transverse axis Q, and/or a rotation about the longitudinal axis L.

3. The fifth wheel coupling system according to claim 2, wherein the degree of freedom enables movement along the transverse axis Q by a length from >0 mm to 30 mm and/or movement along the longitudinal axis L by a length from >0 mm to 40 mm and/or movement along the vertical axis H by a length from >0 mm to 50 mm and/or rotation about the transverse axis Q by an angle from >0° to 30° and/or rotation about the longitudinal axis L by an angle from >0° to 15°.

4. The fifth wheel coupling system according to claim 1, wherein the rotor and the sensor are connected to each other such that relative movement between the rotor and the sensor along the rotation axis D is prevented, or that relative movement between the rotor and the sensor along the rotation axis D is enabled to a defined distance, wherein a retaining spring is provided which acts against an increasing distance between the rotor and the sensor.

5. The fifth wheel coupling system according to claim 1, wherein the bracket is connected to the lower structure and/or the fifth coupling plate via an arm, wherein the bracket is slidable and/or rotatable relative to the arm, and/or wherein the arm is slidable and/or rotatable relative to the lower structure and/or the fifth wheel coupling plate.

6. The fifth wheel coupling system according to claim 5, wherein the bracket and/or the arm are biased by spring force contrary to their slidability and/or rotatability.

7. The fifth wheel coupling system according to claim 5, wherein the bracket is integral and comprises multiple sections, which are connected to each other and movable and/or rotatable relative to each other via at least one flexible region.

8. The fifth wheel coupling system according to claim 5, wherein the bracket and/or the arm consist of a non-magnetisable material.

9. The fifth wheel coupling system according to claim 1, wherein the angle measuring device comprises a centring aid, by which the angle measuring device, and/or the rotor, and/or the magnetic coupling is positioned when the king pin is inserted, wherein the centring aid comprises at least one centring pin and/or a centring contour.

10. The fifth wheel coupling system according to claim 1, wherein the angle measuring device comprises at least one spacer, which extends from the bracket along the vertical axis H beyond the magnetic coupling and prevents the magnetic coupling from coming into direct contact with the king pin and/or causes the magnetic coupling to remain at a predefined distance from the king pin.

11. The fifth wheel coupling system according to claim 1, wherein the angle measuring device comprises at least one protective protrusion for protecting the angle measuring device, or a part thereof, against mechanical damage when a king pin is being inserted.

12. The fifth wheel coupling system according to claim 2, wherein the degree of freedom enables movement along the transverse axis Q by a length from >0 mm to 30 mm and/or movement along the longitudinal axis L by a length from >0 mm to 40 mm and/or movement along the vertical axis H by a length from >0 mm to 50 mm and/or rotation about the transverse axis Q by an angle from >0° to 30° and/or rotation about the longitudinal axis L by an angle from >0° to 15°; and wherein the rotor and the sensor are connected to each other such that relative movement between the rotor and the sensor along the rotation axis D is prevented, or that relative movement between the rotor and the sensor along the rotation axis D is enabled to a defined distance, wherein a retaining spring is provided which acts against an increasing distance between the rotor and the sensor.

13. The fifth wheel coupling system according to claim 12, wherein the bracket is connected to the lower structure and/or the fifth coupling plate via an arm, wherein the bracket is slidable and/or rotatable relative to the arm, and/or wherein the arm is slidable and/or rotatable relative to the lower structure and/or the fifth wheel coupling plate.

14. The fifth wheel coupling system according to claim 13, wherein the bracket and/or the arm are biased by spring force contrary to their slidability and/or rotatability; wherein the bracket is integral and comprises multiple sections, which are connected to each other and movable and/or rotatable relative to each other via at least one flexible region; and wherein the bracket and/or the arm consist of a non-magnetisable material.

15. The fifth wheel coupling system according to claim 14, wherein the angle measuring device comprises a centring aid, by which the angle measuring device, and/or the rotor, and/or the magnetic coupling is positioned when the king pin is inserted, wherein the centring aid comprises at least one centring pin and/or a centring contour; wherein the angle measuring device comprises at least one spacer, which extends from the bracket along the vertical axis H beyond the magnetic coupling and prevents the magnetic coupling from coming into direct contact with the king pin and/or causes the magnetic coupling to remain at a predefined distance from the king pin; and wherein the angle measuring device comprises at least one protective protrusion for protecting the angle measuring device, or a part thereof, against mechanical damage when a king pin is being inserted.

16. A tractor vehicle for a semitrailer comprising a chassis, an undercarriage, and the fifth wheel coupling system according to claim 15, wherein the angle measuring device comprises a bracket, on which the sensor is arranged and within which the rotor is rotatably mounted, wherein the bracket is slidably and/or rotatably connected to the chassis and/or a mounting plate arranged on the chassis.

17. A tractor-semitrailer combination, comprising: the tractor vehicle according to claim 16, wherein the rotor or the sensor is releasably connected to the king pin by the magnetic coupling.

18. A tractor vehicle for a semitrailer, comprising:

a chassis, an undercarriage, and a fifth wheel coupling system comprising a fifth wheel coupling with a lower structure and a fifth wheel coupling plate, which has an insertion opening accessible in the direction of travel F for a king pin of a semitrailer, and a bay for the king pin connecting to the insertion opening in the direction of travel F, and an angle measuring device, which has a rotor and a sensor, wherein the rotor is supported such that it is rotatable relative to the sensor about a rotation axis D, wherein the sensor is configured to detect a rotation of the rotor about the axis of rotation D relative to the sensor, wherein the rotor or the sensor comprises a magnetic coupling, by which the rotor or the sensor is releasably connectable to the king pin, wherein the angle measuring device features at least one degree of freedom relative to the lower structure and/or the fifth wheel coupling plate, wherein the angle measuring device comprises a bracket, on which the sensor is arranged and within which the rotor is rotatably mounted, and wherein the bracket is slidably and/or rotatably connected to the chassis and/or a mounting plate arranged on the chassis and is thereby indirectly connected to the fifth wheel coupling.

19. A tractor-semitrailer combination, comprising: the tractor vehicle according to claim 18, wherein the rotor or the sensor is releasably connected to the king pin by the magnetic coupling.

\* \* \* \* \*